(12) United States Patent
Harima

(10) Patent No.: US 6,623,358 B2
(45) Date of Patent: Sep. 23, 2003

(54) GAME APPARATUS, DATA STORAGE MEDIUM AND COMPUTER PROGRAM

(75) Inventor: Hajime Harima, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/817,173

(22) Filed: Mar. 27, 2001

(65) Prior Publication Data

US 2001/0027129 A1 Oct. 4, 2001

(30) Foreign Application Priority Data

Mar. 29, 2000 (JP) .......................... 2000-092524

(51) Int. Cl.⁷ ................................. A63F 13/00
(52) U.S. Cl. ............................. 463/31; 463/8
(58) Field of Search ................. 463/8, 31, 7, 44, 463/43, 30, 1; 273/148 B

(56) References Cited

U.S. PATENT DOCUMENTS

| | | | | |
|---|---|---|---|---|
| 4,491,324 A | * | 1/1985 | Yoshida | |
| 5,649,862 A | * | 7/1997 | Sakaguchi | |
| 5,827,120 A | * | 10/1998 | Kikuchi et al. | |
| 5,935,003 A | * | 8/1999 | Stephens et al. | |
| 5,971,852 A | * | 10/1999 | Itai et al. | |
| 6,001,017 A | * | 12/1999 | Okano et al. | |
| 6,149,523 A | * | 11/2000 | Yamada et al. | |
| 6,183,365 B1 | * | 2/2001 | Tonomura et al. | |
| 6,210,273 B1 | * | 4/2001 | Matsuno | |
| 6,244,956 B1 | * | 6/2001 | Nakayama et al. | |
| 6,259,431 B1 | * | 7/2001 | Futatsugi et al. | |
| 6,319,121 B1 | * | 11/2001 | Yamada et al. | |
| 6,322,448 B1 | * | 11/2001 | Kaku et al. | |
| 6,354,940 B1 | * | 3/2002 | Itou et al. | |
| 6,379,249 B1 | * | 4/2002 | Satsukawa et al. | |

OTHER PUBLICATIONS

Crawford, Chris, *The Art of Computer Game Design* pp. 21–22, 1984.*
"Doom Manual", 1946.*
Waring, Robert, Doom Totally Unauthorized Tips & Secrets, 1994.*

* cited by examiner

*Primary Examiner*—Michael O'Neill
(74) *Attorney, Agent, or Firm*—Oliff & Berridge, PLC

(57) ABSTRACT

A game apparatus, a storage medium and a computer program, which can generate a more interesting and exciting fighting image by changing a hit effect according to an attack condition. The game apparatus for generating an image to be viewed from a predetermined viewpoint in an object space of a predetermined game wherein a plurality of characters fight with one another, to execute the predetermined game, comprises: a memorizing section (514) for memorizing hit effect data representative of a hit effect, therein; a hit decision section (212) for deciding whether one of the characters hits an attack on one another of the characters, or not; and a hit effect generation section (214) for changing the hit effect data memorized in the memorizing section according to the attack decided by the hit decision section, to generate the hit effect in the object space according to the hit effect data changed thereby.

30 Claims, 14 Drawing Sheets

504

| | ATTACK TECHNIQUE | ATTACK STRENGTH |
|---|---|---|
| CHARACTER 1 | TECHNIQUE a | p 1 1 |
| | TECHNIQUE b | p 1 2 |
| | TECHNIQUE c | p 1 3 |
| | ⋮ | ⋮ |
| CHARACTER 2 | TECHNIQUE a | p 2 1 |
| | TECHNIQUE b | p 2 2 |
| | TECHNIQUE c | p 2 3 |
| | ⋮ | ⋮ |

| | ATTACK STRENGTH | EFFECT PATTERN |
|---|---|---|
| CHARACTER 1 | p 1 1 | A 1 |
| | p 1 2 | A 2 |
| | p 1 3 | A 3 |
| | ⋮ | ⋮ |
| CHARACTER 2 | p 2 1 | B 1 |
| | p 2 2 | B 2 |
| | p 2 3 | B 3 |
| | ⋮ | ⋮ |
| ⋮ | ⋮ | ⋮ |

514

| EFFECT PATTERN A1 | CENTRAL POSITION | SCALE | TRANSPARENCY | COLOR |
|---|---|---|---|---|
| 1ST FRAME | (xL11,yL11,zL11) | s11 | t11 | c11 |
|  | (xL12,yL12,zL12) | s12 | t12 | c12 |
|  | ⋮ | ⋮ | ⋮ | ⋮ |
| 2ND FRAME | (xL21,yL21,zL21) | s21 | t21 | c21 |
|  | (xL22,yL22,zL22) | s22 | t22 | c22 |
|  | ⋮ | ⋮ | ⋮ | ⋮ |
| 3RD FRAME | (xL31,yL31,zL31) | s31 | t31 | c31 |
|  | (xL32,yL32,zL32) | s32 | t32 | c32 |
|  | ⋮ | ⋮ | ⋮ | ⋮ |
| ⋮ | ⋮ | ⋮ | ⋮ | ⋮ |

GAME APPARATUS, DATA STORAGE MEDIUM AND COMPUTER PROGRAM

BACKGROUND OF THE INVENTION

1. Field of the Invention

This invention relates to a game apparatus, a data storage medium and a computer program, for generating a hit effect when one of a plurality of characters hits an attack on one another of the characters while they fights with each other.

2. Description of Related Art

Among television (TV) game apparatuses and so on according to an earlier development, a fighting action game is known. The fighting action game is a game wherein a player operates a game character so that the game character fights with an opponent game character operated by an opponent player or a computer on a TV screen, and thereby the player enjoys the game.

According to the fighting action game and so on, as described above, when the game character hits the attack on the opponent game character, a hit effect is generated at a hit position. Therefore, by impressively expressing that the game character hits the attack on the opponent game character, the fighting action game has generated a forceful fighting image.

Further, for example, when the game character operated by the player has hit the attack on the opponent game character, or when the opponent game character has hit the attack on the game character operated by the player, the hit of the attack is emphasized by the hit effect. Therefore, the fighting action game has excited the player, and increased an enjoyment of the game.

However, in the above-described fighting action game and so on according to an earlier development, the generating direction, the generation form, the generation color or the like, of the hit effect haven't been changed according to the attack condition such as an attack direction, an attack strength, an opponent character or the like. Therefore, if the attack condition is changed, the fighting action game has generated the same hit effect. In other words, every time the character hits the attack on the opponent character, the fighting action game has generated the same hit effect continuously.

Accordingly, even if the character operated by the player hits the attack on the opponent character or when the opponent character hits the attack on the character operated by the player, because the player gradually has got accustomed to the hit effect, the player couldn't be excited. As a result, there has been a problem wherein it is difficult to play the game with enjoyment. Further, because the generating direction of the hit effect is always the same, there has been a problem wherein the generating direction of the hit effect is not changed if the direction of the attack is changed. As a result, it is desired to provide a fighting action game for generating a forceful hit effect according to an attack and so on.

SUMMARY OF THE INVENTION

It is an object of the present invention to provide a game apparatus, a storage medium and a computer program, which can generate a more interesting and exciting fighting image by changing a hit effect according to an attack condition.

In accordance with the first aspect of the present invention, in a game apparatus for generating an image to be viewed from a predetermined viewpoint in an object space of a predetermined game wherein a plurality of characters fight with one another, to execute the predetermined game, the game apparatus comprises: a memorizing section (for example, an effect control data 514 as shown in FIG. 6) for memorizing hit effect data representative of a hit effect, therein; a hit decision section (for example, a hit decision unit 212 as shown in FIG. 6) for deciding whether one of the characters hits an attack on one another of the characters, or not; and a hit effect generation section (for example, a hit effect control unit 214 as shown in FIG. 6) for changing the hit effect data memorized in the memorizing section according to the attack decided by the hit decision section, to generate the hit effect in the object space according to the hit effect data changed thereby.

In accordance with the second aspect of the present invention, in a storage medium having a computer-executable program recorded thereon, the program comprises: a program code of generating an image to be viewed from a predetermined viewpoint in an object space of a predetermined game wherein a plurality of characters fight with one another, to execute the predetermined game; a program code of memorizing hit effect data (for example, an effect control data 514 as shown in FIG. 6) representative of a hit effect; a program code of deciding whether one of the characters hits an attack on one another of the characters, or not; and a program code of changing the hit effect data according to the attack, to generate the hit effect in the object space according to the hit effect data changed.

In accordance with the third aspect of the present invention, a computer program comprises program code means for performing the steps of: generating an image to be viewed from a predetermined viewpoint in an object space of a predetermined game wherein a plurality of characters fight with one another, to execute the predetermined game; memorizing hit effect data representative of a hit effect; deciding whether one of the characters hits an attack on one another of the characters, or not; and changing the hit effect data according to the attack, to generate the hit effect in the object space according to the hit effect data changed.

The hit effect is generated from the hit position when one of the characters, that is, the attack character hits the attack on one another of the characters, that is, the opponent character. For example, the hit effect is like a firework. The hit effect is expressed so as to emphasize the hit of the attack on the opponent character.

According to the game apparatus, the storage medium and the computer program of the first, second and third aspects of the present invention, respectively, because the hit effect data can be changed according to the attack, it is possible to generate the hit effect according to the attack condition. As a result, it is possible to provide a more exciting fighting image to a player. Further, because various types of hit effects can be generated, it is possible that each player maintains the excitement when the character operated by the player hits the attack on the opponent character.

Preferably, in accordance with the game apparatus of the first aspect of the present invention, the hit effect data is modeled into a particle.

Preferably, in accordance with the storage medium having a computer-executable program recorded thereon, of the second aspect of the present invention, the program further comprises: a program code of modeling the hit effect data into a particle.

Preferably, the computer program of the third aspect of the present invention, further comprises program code means for performing the step of: modeling the hit effect data into a particle.

According to the game apparatus, the storage medium and the computer program as described above, because the hit effect data is modeled into a particle, it is possible to variously express the hit effect on the basis of one hit effect data, for example, by changing a transparency, a color, a locus or the like of the particle. As a result, it is possible to easily change the hit effect.

Preferably, in accordance with the game apparatus of the first aspect of the present invention, the hit effect generation section changes the hit effect data to generate the hit effect directed in a direction according to a direction of the attack decided by the hit decision section.

Preferably, in accordance with the storage medium having a computer-executable program recorded thereon, of the second aspect of the present invention, the program further comprises: a program code of changing the hit effect data to generate the hit effect directed in a direction according to a direction of the attack.

Preferably, the computer program of the third aspect of the present invention, further comprises program code means for performing the step of: changing the hit effect data to generate the hit effect directed in a direction according to a direction of the attack.

According to the game apparatus, the storage medium and the computer program as described above, because the hit effect data can be changed according to the direction of the attack, it is possible to directly indicate the direction of the attack on the opponent character, to the player, for example, by always generating the hit effect in the same direction as the direction of the attack. As a result, it is possible to realize the more forceful fighting image.

Preferably, in the accordance with the game apparatus of the first aspect of the present invention, the hit effect generation section changes the hit effect data to generate the hit effect of a type according to a strength or a technique of the attack decided by the hit decision section.

Preferably, in the storage medium having a computer-executable program recorded thereon, of the second aspect of the present invention, the program further comprises: a program code of changing the hit effect data to generate the hit effect of a type according to a strength or a technique of the attack.

Preferably, the computer program of the third aspect of the present invention, further comprises program code means for performing the step of: changing the hit effect data to generate the hit effect of a type according to a strength or a technique of the attack.

According to the game apparatus, the storage medium and the computer program as described above, it is possible to generate the hit effect based on the strength or the technique of the attack. For example, it is possible to generate the larger hit effect when the attack character hits the stronger attack on the opponent character. Further, it is possible to change the form or the color of the hit effect according to the technique of the attack. That is, because the hit effect is generated on the bases of the hit effect data changed according to the strength or the technique of the attack, it does not occur that the player gets used to watching the hit effect. Further, because the strength or the technique of the attack can be indicated to the player, it is possible to realize a more forceful and exciting fighting image.

Preferably, in the game apparatus of the first aspect of the present invention, the hit effect generation section changes the hit effect data to generate the hit effect of a type according to a type of the character which hits the attack decided by the hit decision section.

According to the game apparatus as described above, because the hit effect is generated according to the type of the character hitting the attack on the opponent character, it is possible to emphasize the personality of each character. As a result, it is possible that each player is greatly attached to the character operated thereby.

Preferably, in accordance with the game apparatus of the first aspect of the present invention, the hit effect generation section changes the hit effect data to generate the hit effect having a disappearing speed according to a strength or a technique of the attack decided by the hit decision section.

According to the game apparatus as described above, because the disappearing speed of the hit effect can be changed according to the strength or the technique of the attack, it is possible to display the hit effect for a longer time, by slowing the disappearing speed of the hit effect, for example, when the attack character hits the stronger attack on the opponent character. Further, because the disappearing speed of the hit effect can be changed according to the technique of the attack, it is possible to generate the more various hit effects according to the attack condition.

Preferably, the game apparatus of the first aspect of the present invention, further comprises: a light source setting section for setting a predetermined light source in the object space on the basis of a position at which the hit effect is generated, when the hit effect generation section generates the hit effect.

Preferably, in the accordance with the storage medium having a computer-executable program recorded thereon, of the second aspect of the present invention, the program further comprises: a program code of setting a predetermined light source in the object space on the basis of a position at which the hit effect is generated, when the hit effect is generated.

Preferably, the computer program of the third aspect of the present invention, further comprises program code means for performing the step of: setting a predetermined light source in the object space on the basis of a position at which the hit effect is generated, when the hit effect is generated.

According to the game apparatus, the storage medium and the computer program as described above, for example, it is possible that the hit effect is illuminated with a light from the light source. Consequently, because the characters and the objects in the object space are illuminated with the hit effect, it is possible to display a more impressive fighting image.

Preferably, in accordance with the game apparatus as described above, the predetermined light source has a color fitted to a color of the hit effect generated by the hit effect generation section.

According to the game apparatus as described above, because the characters and the objects in the object space are illuminated with the hit effect, it is possible to increase a visual effect of the hit effect.

Preferably, in accordance with the game apparatus as described above, the light source setting section sets the predetermined light source so as to have a strength or an irradiating range according to the attack decided by the hit decision section.

According to the game apparatus as described above, it is possible to set the light source having the strength or the irradiating range according to the strength of the attack. For example, because the stronger the strength of the attack is, the stronger the strength of the light source is set or the larger the irradiating range of the light source is set, it is possible to emphasize the illumination with the hit effect on the basis of the strength of the attack.

In accordance with the fourth aspect of the present invention, a game apparatus comprises: an executing section for executing a predetermined game wherein a plurality of characters fight with one another; a memorizing section for memorizing hit effect data representative of a hit effect, therein; a hit decision section for deciding whether one of the characters hits an attack on one another of the characters, or not; and a image generation section for generating an image including the hit effect, to be viewed from a predetermined viewpoint in an object space of the predetermined game, on the basis of the hit effect data memorized in the memorizing section according to the attack decided by the hit decision section.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein:

FIG. 8 is a diagram showing an exemplary data configuration of an effect pattern data 512;

PREFERRED EMBODIMENT OF THE INVENTION

Hereinafter, a preferred embodiment of the present invention will be explained with reference to figures, as follows. Although the case wherein the present invention is applied to a fighting action game will be mainly explained as follows, it is not limited to the fighting action game to which the present invention is applied.

Figure 1:
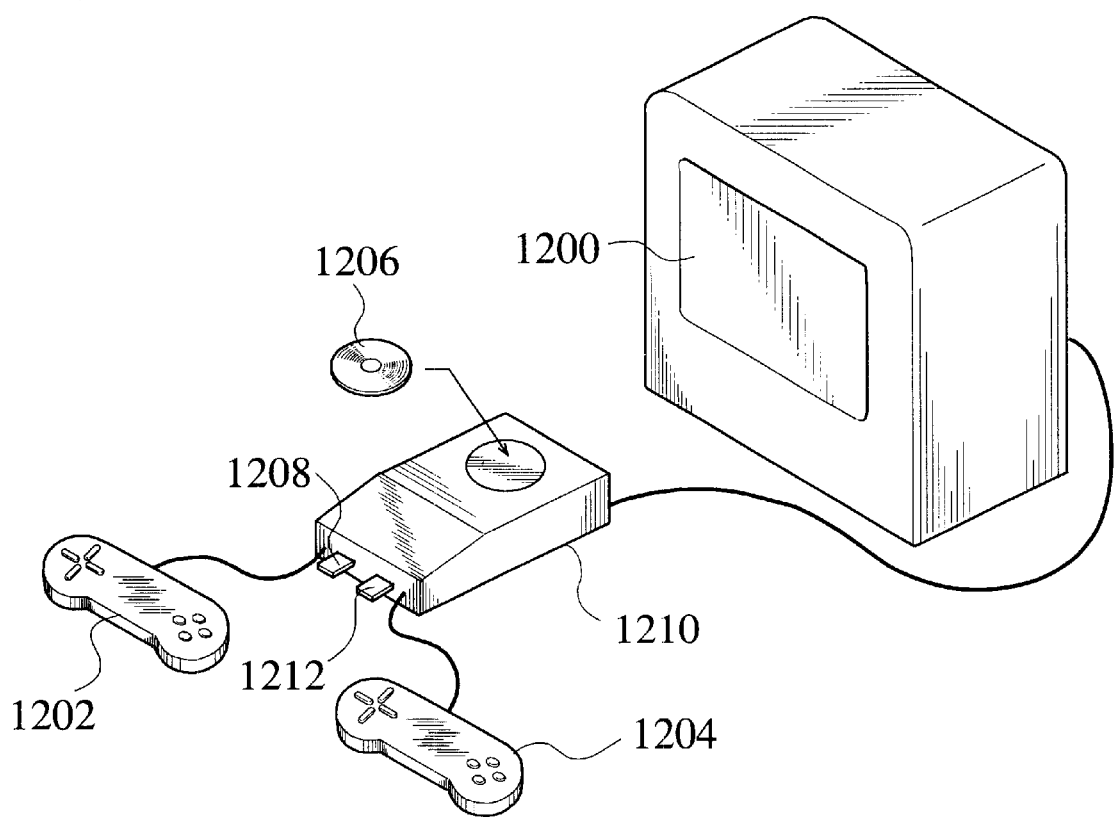
FIG. 1 is a perspective view showing an exemplary case wherein a game apparatus of the present invention is applied to a consumer game machine.

FIG. 1 is a view showing one example of the case wherein the game apparatus of the present invention is applied to a consumer game machine.

In FIG. 1, the users operate game controllers 1202 and 1204, respectively, as watching a game image displayed on a display 1200, so that the player characters kick, punch or the like. Thereby, the users enjoy playing the fighting action game. In the case as described above, necessary data to play the game, such as a game program and so on, is stored in an data storage media detachable from and attachable to an apparatus body 1210, for example, a CD-ROM 1206, an IC card 1208, a memory card 1212 and so on.

FIGS. 2 to 5 are views showing exemplary screens wherein the character 2-1 or 2-2 of characters displayed on the display 1200, hits an attack on the character 3 as an opponent. Hereinafter, the character making an attack will be referenced to as an attack character. The character been under attack will be referenced to as an opponent character.

Figure 2:
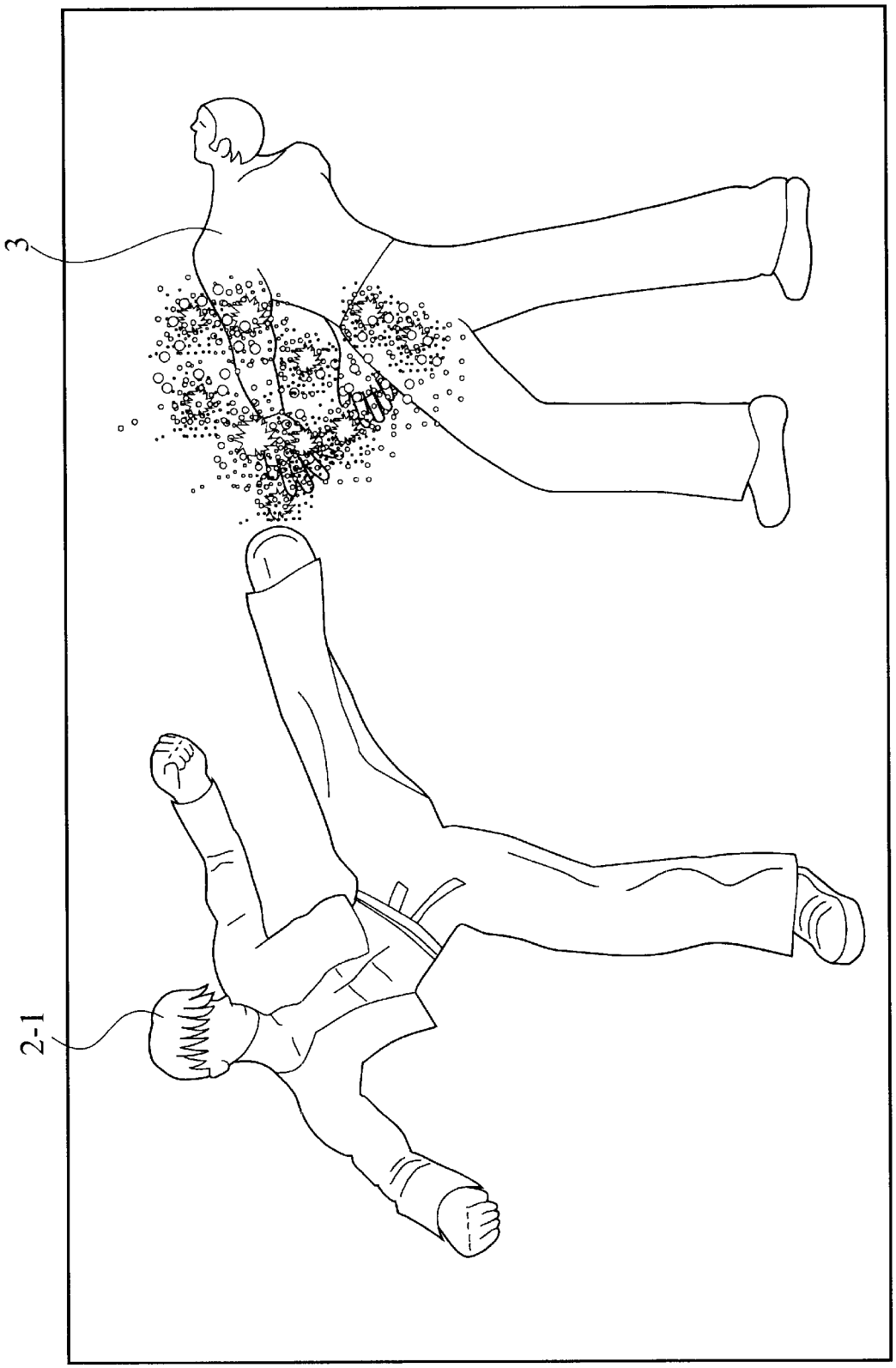
FIG. 2 is a view showing an exemplary screen displayed on a display 1200, wherein an attack character has hit an attack on an opponent character.

FIG. 2 is a view showing an exemplary screen wherein the attack character 2-1 kicks the opponent character 3 by a left foot thereof to hit the opponent character 3.

As shown in FIG. 2, the hit effect is generated from the hit position in the substantially same direction as the attack direction. Further, the attack character 2-1 is illuminated with the light from the hit effect.

Figure 3:
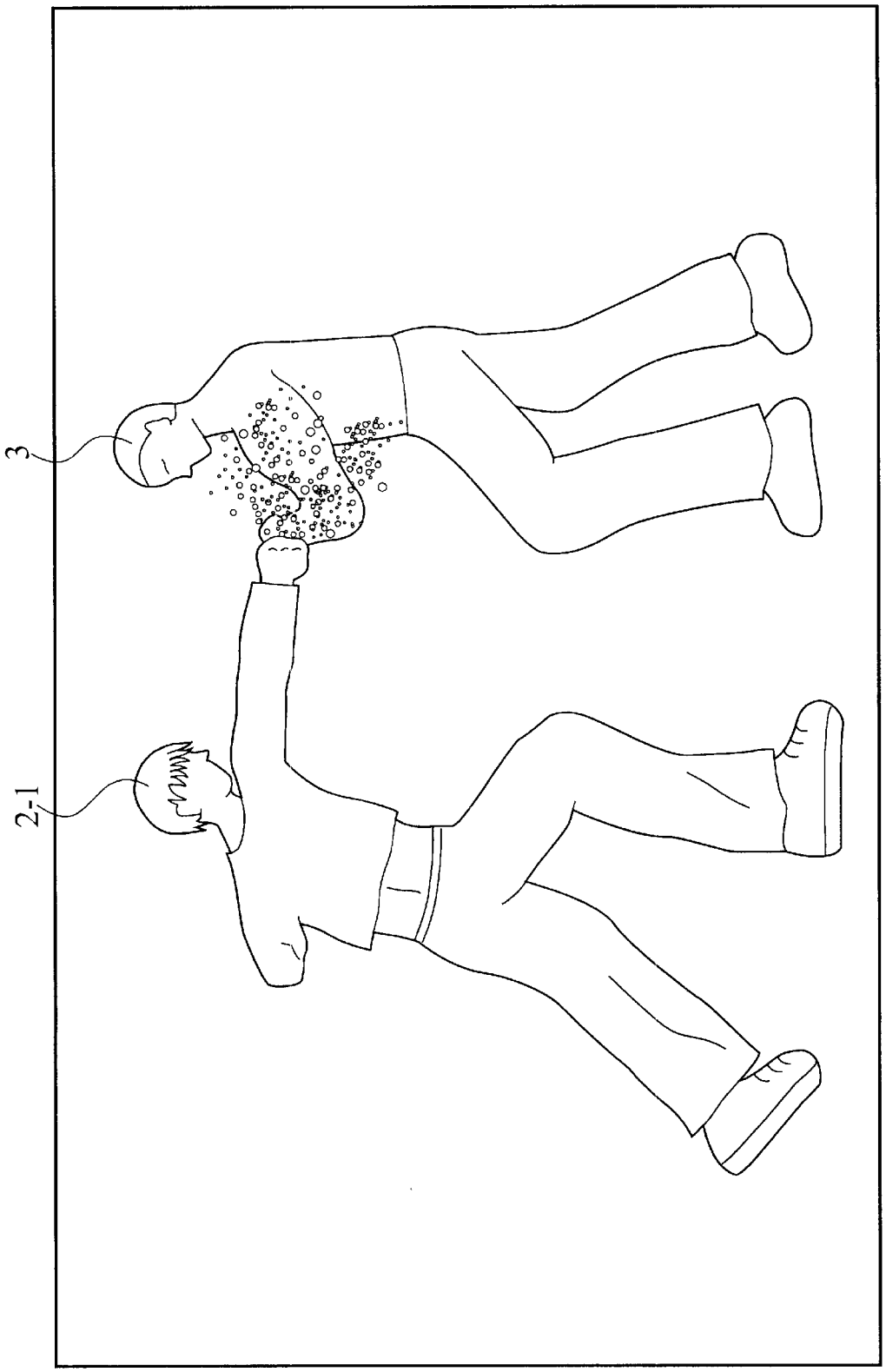
FIG. 3 is a view showing an exemplary screen displayed on a display 1200, wherein an attack character has hit an attack on an opponent character.

FIG. 3 is a view showing an exemplary screen wherein the attack character 2-1 punches the opponent character 3 by a right hand thereof to hit the opponent character 3.

As shown in FIG. 3, the hit effect is generated so as to have the different form from one of the hit effect shown in FIG. 2. That is, the hit effect is generated so as to have the color, the form, the size, the disappearing speed and so on according to the strength and the technique of the attack.

Figure 4:
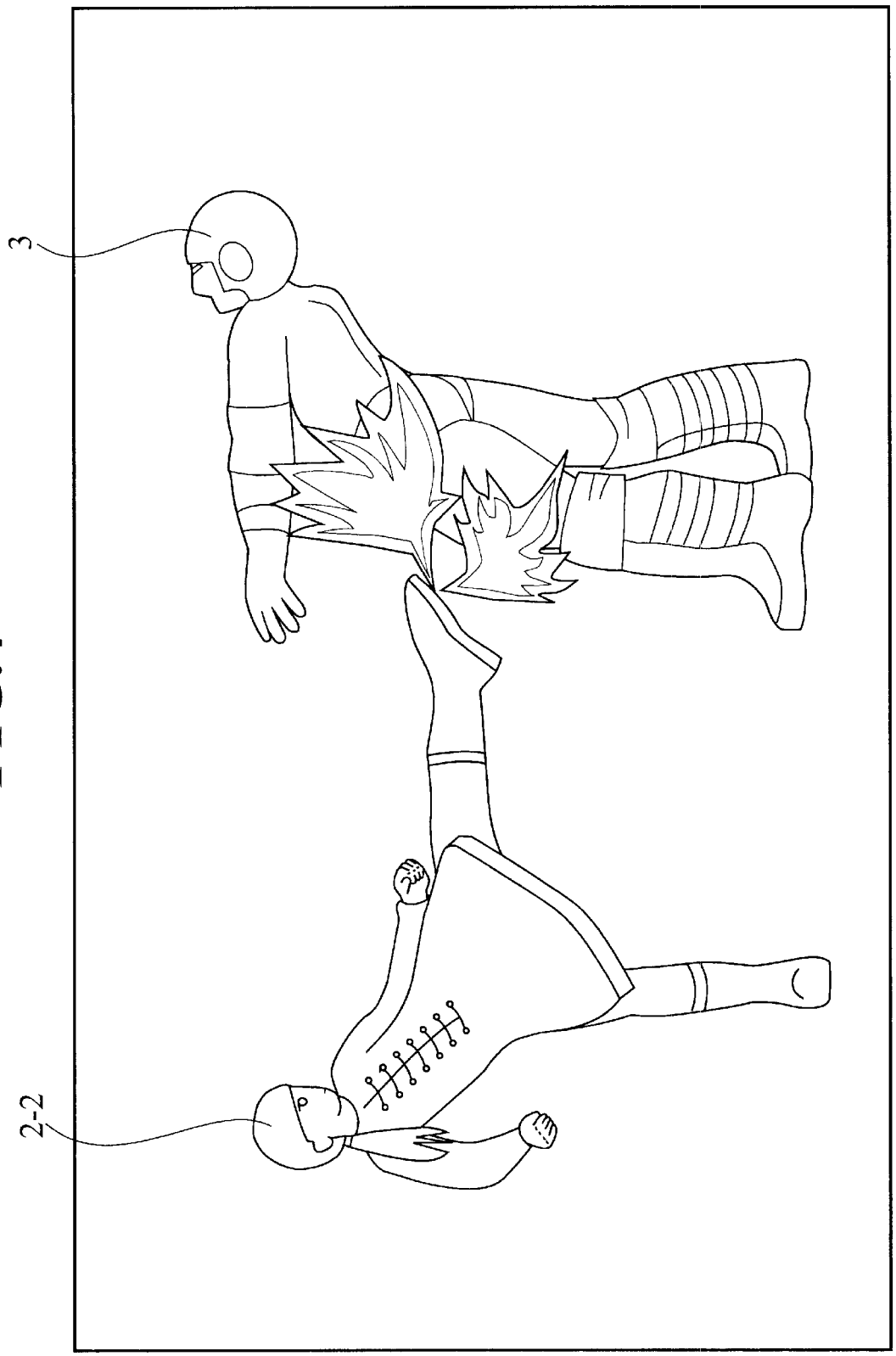
FIG. 4 is a view showing an exemplary screen displayed on a display 1200, wherein an attack character has hit an attack on an opponent character.

FIG. 4 is a view showing an exemplary screen wherein the attack character 2-2 different from the attack character 2-1 shown in FIGS. 2 and 3 hits the opponent character 3.

As shown in FIG. 4, the attack character 2-2 kicks the opponent character 3 by a left foot thereof, like the case as shown in FIG. 2. However, the hit effect generated at the hit position has the color, the form, the size and so on different from one of the hit effect as shown in FIG. 2. As described above, the hit effect may be generated so as to have the color, the form, the size, the disappearing speed and so on according to the character. In the case as described above, because the personality of the character is emphasized, it is possible that the player becomes attached to the character more.

Figure 5:
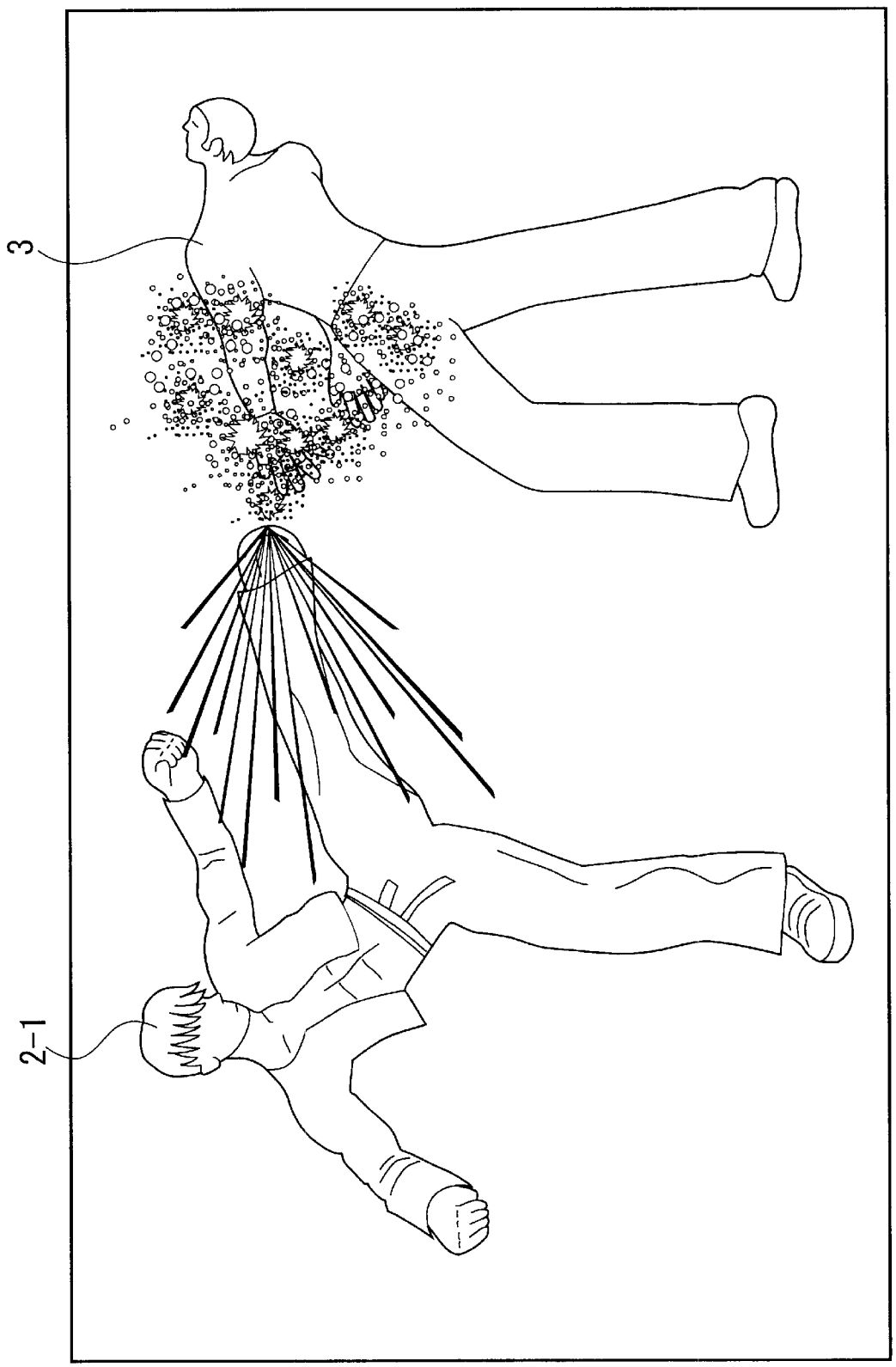
FIG. 5 is a view showing an exemplary screen displayed on a display 1200, wherein an attack character has hit an attack on an opponent character.

FIG. 5 is a view showing an exemplary screen wherein the hit effect is generated at the hit position in the direction opposite to the attack direction.

As shown in FIG. 5, a plurality of hit effects may be generated at the hit position. In the case, the hit effect generated in the direction opposite to the attack direction, may be related to the opponent character. Further, for example, when both characters fight with each other, to hit the attacks on each other at the same time, each hit effect may be generated at each hit position according to each attack direction and strength, or the only hit effect having the greatest attack strength may be generated.

As described above, the hit effect is generated in the direction according to the attack direction, for example, in the same direction as the attack direction. Further, the hit effect is generated so as to have the color, the form, the size, the disappearing speed and so on, changed according to the attack strength, the attack character, the attack technique such as a kick, a punch or a special technique, or the like. As a result, it is possible to display a more forceful and exciting fighting image emphasizing the attack direction, the attack strength, the personality of each character, or the like.

For example, when the attack character hits the attack technique having the larger attack strength on the opponent character, the large hit effect may be generated so as to have the brighter color. Accordingly, the fighting image can directly inform the player that the attack character hits the attack technique having the larger attack strength on the opponent character. As a result, it is possible to provide a more exciting and forceful game image to the players on both sides attacking the opponent character and attacked by the attack character.

Figure 6:
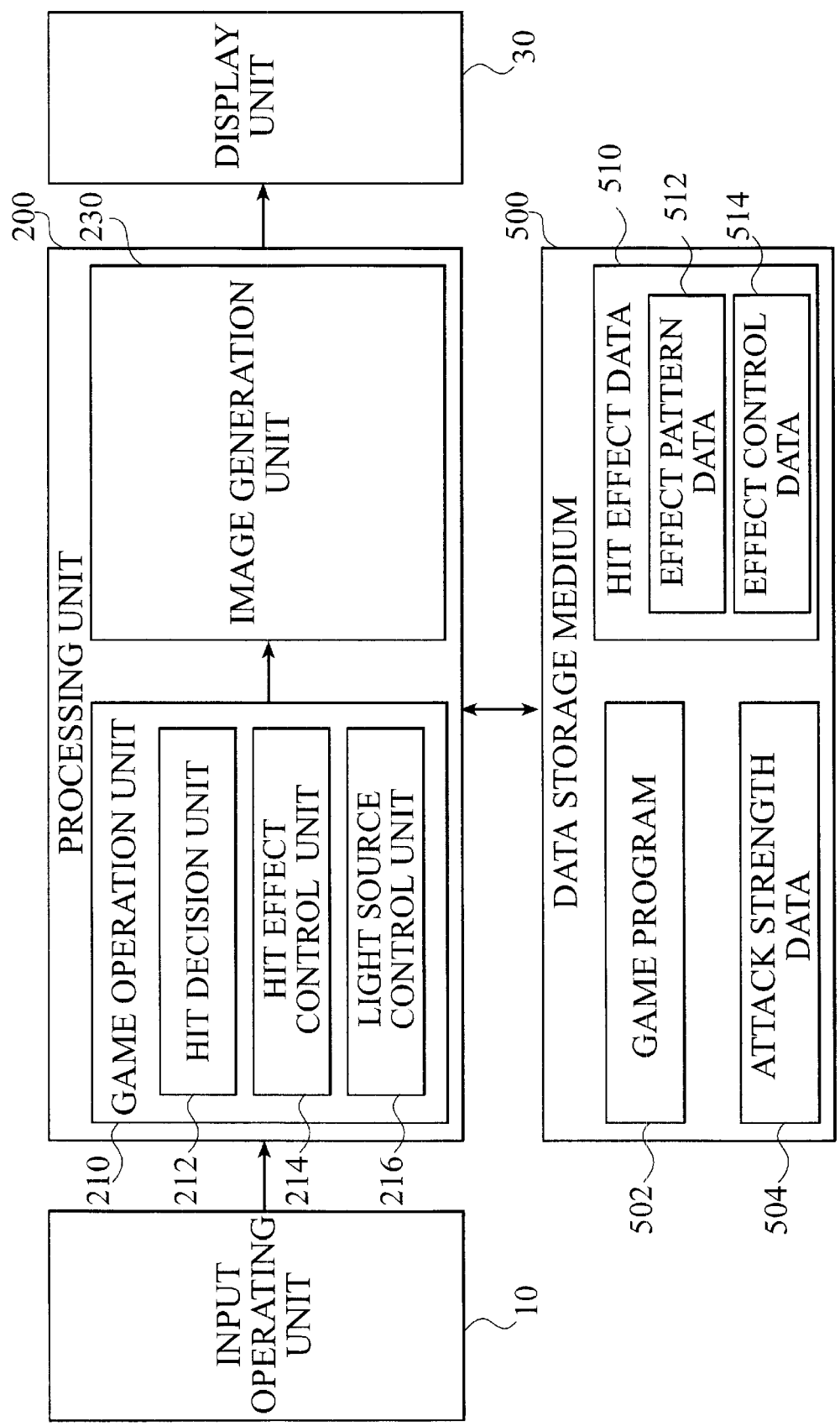
FIG. 6 is a block diagram showing an example of a functional block of a game apparatus according to an embodiment of the game apparatus of the present invention.

FIG. 6 is a functional block diagram of the game apparatus according to the embodiment of the present invention. As shown in FIG. 6, the game apparatus comprises an input operating unit 10, a processing unit 200, a display unit 30, and a data storage medium 500.

The input operating unit 10 comprises an operating button for operating the moving direction, the jumping movement and the crouching movement, another operating button for operating the kicking movement and the punching movement, of the character operated by the player in the game, and so on. Further, the input operating unit 10 outputs the operating signal from each button, to the processing unit 200. The input operating unit 10 is related to the game controllers 1202, 1204 and so on.

The processing unit 200 comprises a game operation unit 210 and an image generation unit 230.

The game operation unit 210 carries out a processing of moving characters in the object space according to the operating signal outputted from the input operating unit 10, a processing of deciding the attack technique according to the movement of the character, a processing of progressing the game on the basis of a game program 502, a processing of calculating a central position of gravity of each character, a processing of setting a predetermined view point when the image generation unit 230 generates the image, and so on.

Further, the game operation unit 210 comprises a hit decision unit 212, a hit effect control unit 214, and a light source control unit 216.

The hit decision unit 212 decides whether or not the attack character hits the attack on the opponent character. When the hit decision unit 212 decides that the attack character hits the attack on the opponent character, the hit decision unit 212 carries out a processing of detecting the hit position to decide the attack direction and so on, a processing of deciding the attack strength from an attack strength data 504 according to the attack technique attacked by the attack character, and so on.

The hit decision unit 212 decides the attack direction directed to the hit position, on the basis of the hit position and the position of the attack part of the attack character on the frame just before the hit. For example, the attack part of the attack character is the right fist in the case wherein the attack character hits the opponent character by the right punch thereof.

More particularly, in the case wherein the hit position in the object space is the world coordinates (xw1, yw1, zw1), and the position of the attack part of the attack character on the frame just before the hit is the world coordinates (xw0, yw0, zw0), the attack direction is the direction directed from coordinates (xw0, yw0, zw0) to (xw1, yw1, zw1).

Figure 7:
FIG. 7 is a diagram showing an exemplary data configuration of an attack strength data 504.

FIG. 7 is a diagram showing an exemplary data configuration of the attack strength data 504.

According to the attack strength data 504 as shown in FIG. 7, the attack techniques are related to the attack strengths, respectively, in each character. For example, according to the character 1, the attack technique "technique a" is related to the attack strength "p11".

The hit decision unit 212 decides the vector directed from the coordinates (xw0, yw0, zw0) of the attack part on the frame just before the hit to the coordinates (xw1, yw1, zw1) of the hit position, and decides the attack direction on the basis of the direction of the vector. Further, the hit decision unit 212 may decide the attack strength on the basis of the magnitude of the vector.

The hit effect control unit 214 obtains the attack direction and the attack strength decided by the hit decision unit 212. Thereafter, the hit effect control unit 214 carries out a processing of specifying the effect pattern from the effect pattern data 512 according to the attack character and the attack strength, a processing of changing the direction of the effect pattern according to the attack direction, a processing of generating the hit effect at the hit position on the basis of the effect control data 514 according to the specified effect pattern and the changed direction of the specified effect pattern.

FIG. 8 is a diagram showing an exemplary data configuration of the effect pattern data 512.

According to the effect pattern data 512 as shown in FIG. 8, the attack strengths are related to the effect patterns, respectively, in each character. For example, when the character 1 hits the attack having the attack strength "p11" on the opponent character, the hit effect control unit 214 specifies the effect patter A1 as the pattern of the hit effect to be generated, from the effect pattern data 512.

Figures 9, 10:
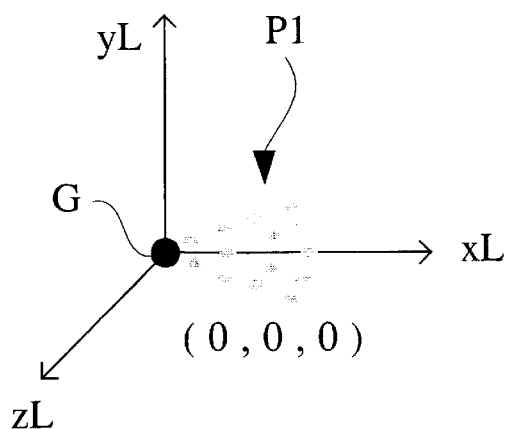
FIG. 9 is a diagram showing an exemplary data configuration of an effect control data 514.
FIG. 10 is a schematic view showing a hit effect set in a local coordinates on the basis of the effect control data 514.

FIG. 9 is a diagram showing an exemplary data configuration of one effect pattern in the effect control data 514.

According to the effect control data 514 shown in FIG. 9, the central position, the scale, the transparency and the color of the particle forming the hit effect are related to each other, respectively, in each frame, every effect pattern.

The central position is a data representative of the central position of the particle in a local coordinates. For example, a plurality of particles are in the $1^{st}$ frame, wherein the particles have the central position at the coordinates (xL11, yL11, zL11), (xL12, yL12, zL12) and so on, respectively. The scale is a data representative of the size of the particle. The transparency is a data representative of the transparency of the particle. The color is used as data representative of a color of the particle.

For example, in the $1^{st}$ frame, according to the particle having the central position at the coordinates (xL11, yL11, zL11), the scale, the transparency, and the color are equal to "s11", "t11" and "c11", respectively.

Just after the hit decision unit 212 decides that the attack character hits the attack on the opponent character, the hit effect control unit 214 controls or operates the particles during the predetermined number of frames according to the effect control data 514. More specifically, the state of the particles forming the hit effect just after the decision of hit, are set in the $1^{st}$ frame.

According to the effect control data 514, each central position is set so that the particles are generated from an origin point of the local coordinates in the direction of the xL axis. In other words, the hit effect is generated in the direction of the xL axis in the local coordinates during the number of frames stored in the effect control data 514 just after the decision of the hit.

Further, according to the effect control data 514, for example, the transparency and the length of the locus may be further set in each particle. In the case, the locus of the movement of each particle is changed according to the attack strength, the attack technique or the like, and thereby it is possible to express one hit effect in various ways.

Furthermore, according to the effect control data 514, the expression for defining the movement of each particle may be further set in each particle. In the case, the hit effect control unit 214 may control each particle according to the expression.

FIG. 10 is an exemplary schematic view showing the hit effect composed of the particles set according to the effect control data 514.

As shown in FIG. 10, according to the particles P1, each particle is positioned so as to be centered around each central position in the local coordinates, set in the effect control data 514. More particularly, the hit effect is generated in the direction of the xL axis from a generating point G that is the origin point of the local coordinates.

Further, the hit effect control unit 214 rotates the local coordinates shown in FIG. 10 about the yL axis of the local coordinates, so that the direction of an xw-zw plane corresponding to the attack direction decided by the hit decision unit 212 becomes the direction of the xL axis of the local coordinates. Furthermore, the hit effect control unit 214 sets the origin point (generating point G) at the hit position on the world coordinates. Thereby, the generating direction and the generating position of the hit effect are decided.

Figure 11A:
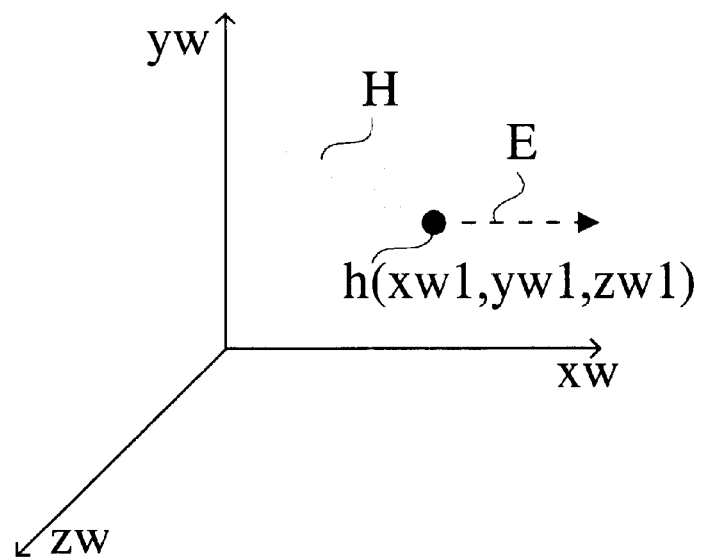
FIGS. 11A and 11B are views showing a relationship between a generating direction of the hit effect and an attack direction.
Figure 11B:
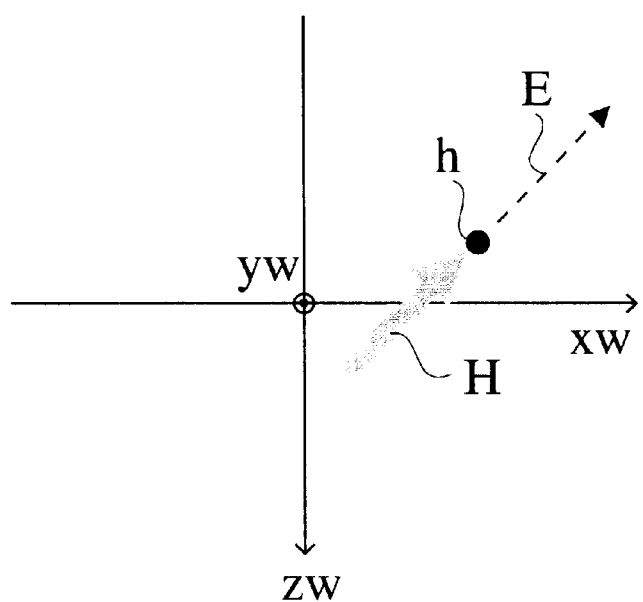

FIGS. 11A and 11B show exemplary schematic views showing a relationship between the attack direction and the generating direction of the hit effect. FIG. 11A is a view showing the relationship between the attack direction and the generating direction of the hit effect in the object space in the world coordinates. FIG. 11B is a view wherein FIG. 11A is viewed from the direction of the yw axis.

In FIGS. 11A and 11B, the attack direction decided by the hit decision unit 212 is referenced to as a vector H having the direction directed to the hit position h from the position of the attack part on the frame just before the hit, and represented by a thick arrow. The generating direction of the hit effect is referenced to as a vector E having the direction of the xL axis in the local coordinates rotated about the yL axis by the hit effect control unit 214, and represented by a dashed arrow.

The direction of the vector E is set to the same direction as one of the vector H considering only the x and y components thereof. More specifically, as shown in FIG. 11B, the vector E is set so as to be a vector having the same direction as one of the vector H viewed from the direction of the yw axis.

For example, when the hit position h is the coordinates (xw1, yw1, zw1), the hit effect control unit 214 shifts the origin point of the local coordinates shown in FIG. 10 to the coordinates (xw1, yw1, zw1). Thereafter, the hit effect control unit 214 rotates the local coordinates around the yL axis so as to align the xL axis with the vector E, and sets the local coordinates in the world coordinates. As a result, the hit effect control unit 214 sets the hit effect having the generating direction substantially equal to the attack direction.

In order to make the generating direction of the hit effect perfectly agree with the attack direction, it is necessary that the local coordinates are rotated about not only the yL axis but also another axis. However, in order to make the generating direction of the hit effect substantially agree with the attack direction, it is sufficient that the local coordinates are rotated about only the yL axis. Accordingly, it is possible to reduce the amount of the processing by the hit effect control unit 214. For the reason as described above, according to the embodiment, the generating direction of the hit effect is not set so as to perfectly agree with the attack direction.

Further, even if the generating direction of the hit effect is not set so as to perfectly agree with the attack direction, when the generating direction of the hit effect is set so as to substantially agree with the attack direction, it is possible that the hit effect is displayed on the display so as to generate in the same direction as the attack direction. Accordingly, it is possible that the player obtain the effect like one in the case wherein the generating direction of the hit effect is set so as to perfectly agree with the attack direction.

Further, for example, for the attack technique which always hit on the opponent character from the oblique upper direction, the central position of each particle may be set in the effect control data 514 in order to generate the hit effect from the origin point in the oblique lower direction on the xL axis. Accordingly, the hit effect may be generated in the more exactly same direction as the attack direction.

Furthermore, for example, the local coordinates in which the effect patterns are set may be rotated and moved about the xL axis or the zL axis. In this case, if the effect control data 514 has the only data generated in the direction of the xL axis, as the effect pattern, it is possible to generate the hit effect in the perfectly same direction as the attack direction for any attack direction.

The light source control unit 216 carries out a processing of setting a light source according to the hit effect generated at the hit position by the hit effect control unit 214.

More particularly, for example, the light source control unit 216 decides a parallel light directed from the generating position of the hit effect, that is, the hit position, to the central position of gravity of the attack character, calculated by the game operation unit 210. The parallel light is set according to the light source having the strength based to the attack strength and the color based the color of the hit effect. Further, the light source control unit 216 decides a light irradiating range of the light source to illuminate the attack character with the parallel light.

Further, the light source control unit 216 decides a light emitting time (the number of frames) according to the disappearing speed of the hit effect, that is, the speed of changing the transparency in the effect control data 514. Thereafter, the light source control unit 216 gradually reduces the strength of the light source, that is, gradually returns to the state before the hit, according to the lapse of the light emission time.

As described above, the attack character is illuminated with the light from the light source having the color of the hit effect, by generating the hit effect. As a result, it is possible to provide a larger visual effect in concern to the hit effect, to the player, and it is possible to realize a more forceful fighting image.

The light source control unit 216 may further set another light source whose light is directed from the hit position to the center of gravity of the attack character. In this case, the light source control unit 216 decides the light irradiating range for the attack character.

Further, the light source control unit 216 may further set a spotlight source or a point light source at the hit position.

Further, the light source control unit 216 may decide a region apart from the hit position within a predetermined distance, as the light irradiating range of the light source. In this case, all of objects positioned within the light irradiating range, not only each character, are illuminated with the light from the light source.

Furthermore, the light source control unit 216 may change the light irradiating range by changing the predetermined distance according to the attack strength.

Furthermore, the light source control unit 216 may decide the irradiating direction of the light source according to the generating direction of the hit effect. However, when the light source control unit 216 set the point light source, it is unnecessary that the light source control unit 216 decides the irradiating direction of the point light source.

The image generation unit 230 carries out a processing of generating images such as the game image described with reference to FIGS. 2 to 5, and so on. That is, the image generation unit 230 generates images viewed from the predetermined viewpoint in the object space set by the game operation unit 210. In this case, the image generation unit 230 carries out a processing such as a shading processing on the basis of the light source set by the light source control unit 216, and so on.

The processing unit 200 has a function realizable by hardware such as a CISC type or RISC type of CPU, a DSP, an image read-in IC, a memory or the like.

The display unit 30 displays the image generated by the image generation unit 230, and so on, thereon. For example, the display unit 30 is realized as a CRT, an LCD, a plasma display or the like. The display 1200 as shown in FIG. 1 corresponds to the display unit 30.

The data storage medium 500 stores not only the game programs 502, but also the attack strength data 504 and the hit effect data 510 including the effect pattern data 512 and the effect control data 514, therein. The data storage medium 500 has a function realizable by hardware such as a CD-ROM, a game cassette, an IC card, an MO, an FD, a DVD, a memory, a hard disk or the like.

Figure 12:
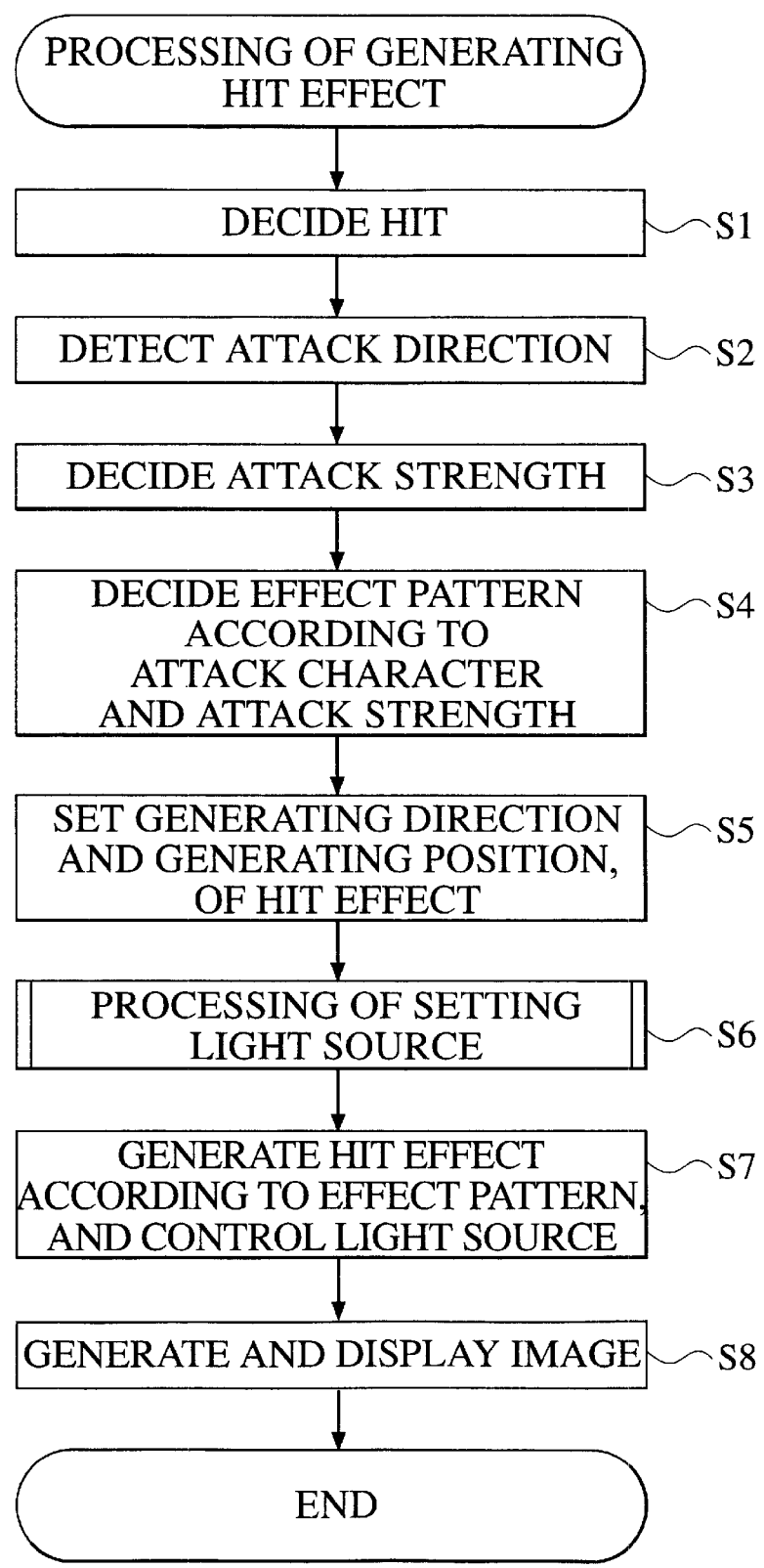
FIG. 12 is a flow chart showing a processing of generating a hit effect.

Next, according to the embodiment of the present invention, the processing of the generating the hit effect by the game operation unit 210 and the image generation unit 230, will be explained with reference to the flow chart as shown in FIG. 12, as follows.

When the hit decision unit 212 of the game operation unit 210 decides that the attack character hits the attack on the opponent character, to detect the hit position (Step S1), the hit decision unit 212 detects the attack direction on the basis of the position of the attack part and the hit position of the attack character just before the hit (Step S2). Thereafter, the hit decision unit 212 decides the attack strength according to the attack technique, from the attack strength data 504 (Step S3).

Thereafter, the hit effect control unit 214 of the game operation unit 210 decides the effect pattern according to the attack character and the attack strength, from the effect pattern data 512 (Step S4). Then, the hit effect control unit 214 rotates the local coordinates setting the effect pattern thereon, about the yL axis so that the xL axis of the local coordinates is directed in the same direction as the attack direction, and sets the generating direction of the hit effect. Further, the hit effect control unit 214 shifts the origin point of the local coordinates to the hit position in parallel, and sets the generating position (generating point G) of the hit effect (Step S5).

Figure 13:
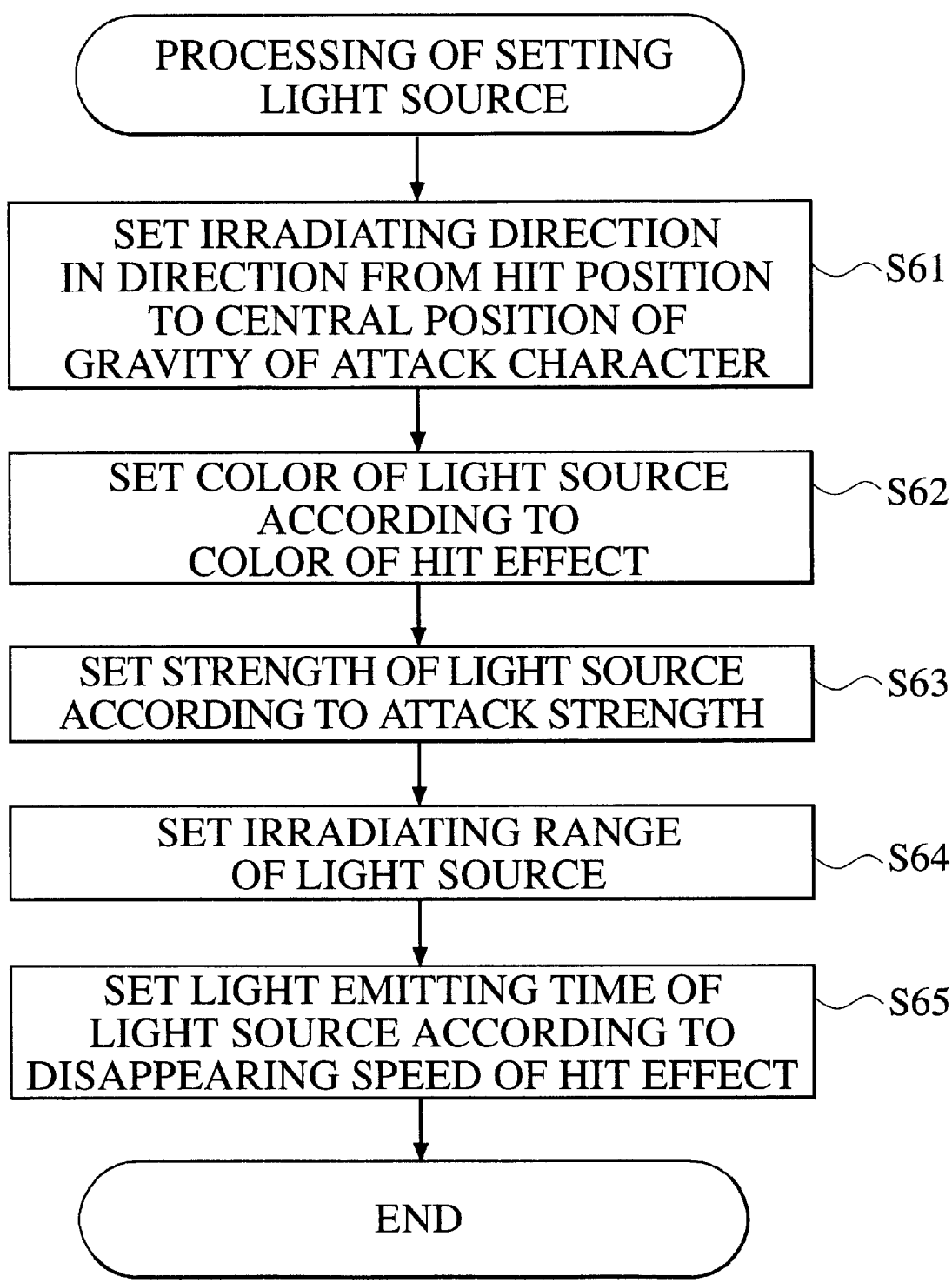
FIG. 13 is a flow chart showing a processing of setting a light source.

Thereafter, the light source control unit 216 of the game operation unit 210 carries out a processing of setting a light source as shown in FIG. 13, and sets the irradiating direction, the color, the strength, the irradiating range, the light emitting time and so on, of the light source (Step S6).

Thereafter, the hit effect control unit 214 generates the hit effect from the hit position according to the effect pattern decided at the step S4 and the generating direction of the hit effect set at the step S5. At the same time, the light source control unit 216 controls the strength, the irradiating direction and so on, of the light source according to the light emitting time set at the step S6, and controls the light source so that the light source has gone after the lapse of the light emitting time (Step S7).

Thereafter, the image generation unit 230 generates the image to be viewed from the predetermined viewpoint and displays the image on the display unit 30 (Step S8).

Then, the game operation unit 210 and the image generation unit 230 finish the processing of generating the hit effect.

Next, according to the embodiment of the present invention, a processing of setting the light source by the light source control unit 216 will be explained with reference to a flow chart as shown in FIG. 13, as follows.

The light source control unit 216 sets the irradiating direction of the light source in the direction from the hit position decided at the step S1 in FIG. 12 to the central position of gravity of the attack character (Step S61). Then, the light source control unit 216 obtains the color data of the hit effect set by the hit effect control unit 214, and sets the color of the light source according to the color of the hit effect (step S62).

Thereafter, the light source control unit 216 sets the strength of the light source according to the attack strength (Step S63), and sets the irradiating range of the light source for the attack character (Step S64). Further, the light source control unit 216 sets the light emitting time of the light source according to the disappearing speed of the hit effect (Step S65). Then, the light source control unit 216 finishes the processing of setting the light source.

Next, an exemplary hardware configuration realizable the embodiment of the game apparatus of the present invention will be explained with reference to FIG. 14, as follows.

Figure 14:
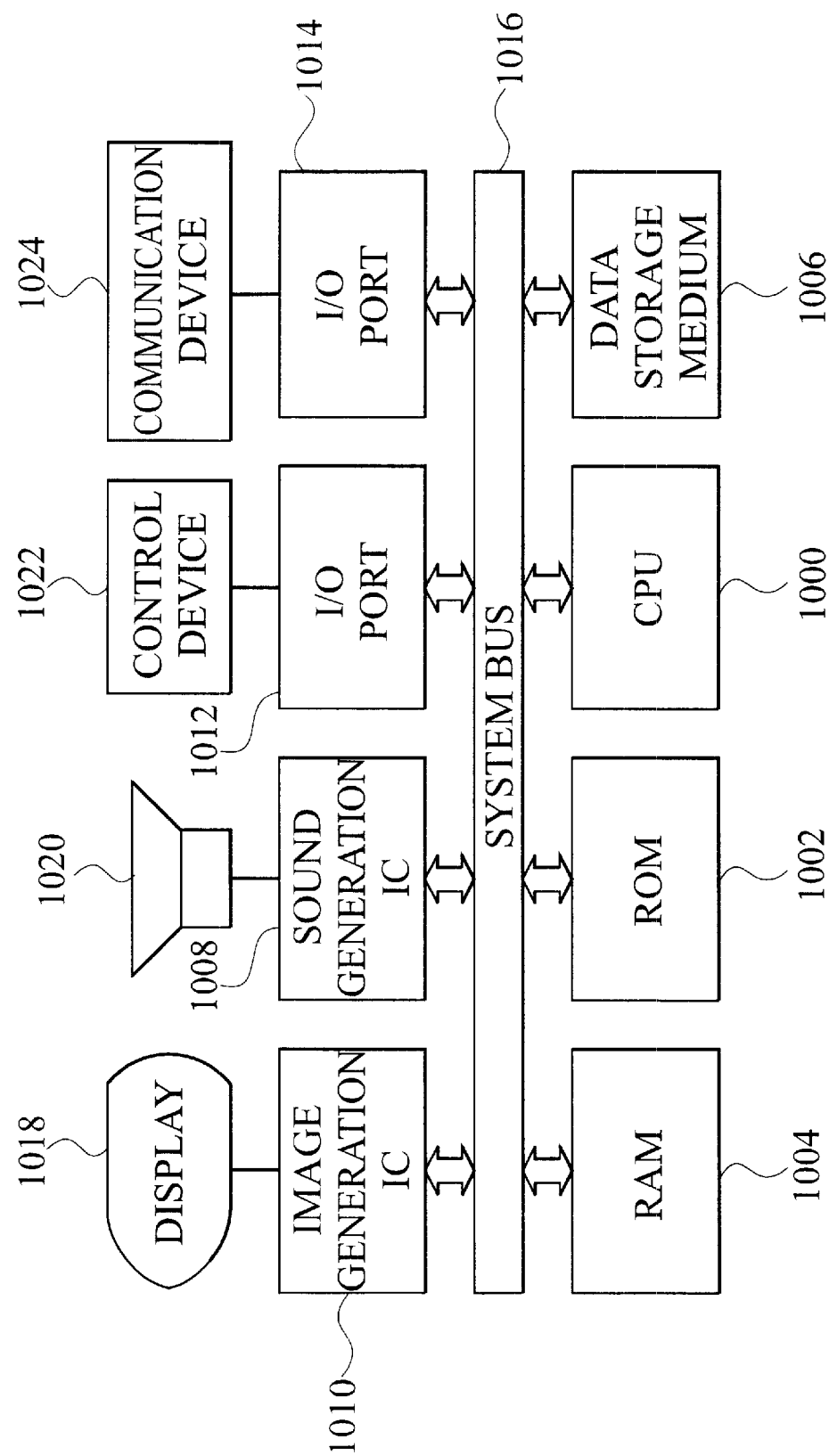
FIG. 14 is a block diagram showing an exemplary hardware configuration realizable the embodiment of the game apparatus of the present invention.

The game apparatus as shown in FIG. 14 comprises a CPU 1000, a ROM 1002, a RAM 1004, a data storage medium 1006, a sound generation IC 1008, an image generation IC 1010, and I/O ports 1012 and 1014, wherein they are interconnected by a system bus 1016 so that data can be exchanged therebetween. A display 1018 is further connected to the image generation IC 1010, a speaker 1020 is connected to the sound generation IC 1008, a control device 1022 is connected to the I/O port 1012, and a communication device 1024 is connected to the I/O port 1014.

The data storage medium 1006 stores primarily software program, image data for expressing displayed objects, sound data, play data and so on, and relates to the data storage medium 500 as shown in FIG. 6.

For example, in the case wherein the game apparatus of the present invention is realized as a computer, a CD-ROM, a DVD and other medium can be used as the data storage medium for storing the game program and other data. Further, in the case wherein the game apparatus is realized as a consumer game machine, not only a CD-ROM and a DVD but also a game cartridge and other medium can be used as the data storage medium. Furthermore, in the case wherein the game apparatus is realized as an arcade game machine, a memory such as a ROM and so on and a hard disc can be used as the data storage medium, and the data storage medium 1006 relates to the ROM 1002.

The control device 1022 is equivalent to the game controller, the operating panel, or other such device. Further, the control device 1022 is used by the user when the user inputs the results of the decisions to the apparatus body while playing the game.

The CPU 1000 controls the overall of the game apparatus and processes various data according to the game program stored to the data storage medium 1006, the system program (including initialization data for the game apparatus, and so on) stored to the ROM 1002, signals inputted from the control device 1022, and so on.

The RAM 1004 is a storage means used as an operating memory by the CPU 1000. The RAM 1004 stores particular contents from the data storage medium 1006 and the ROM 1002, operating results by the CPU 1000, and so on.

The sound generation IC 1008 and the image generation IC 1010 are also disposed in this type of game apparatus, to generate and output sounds and images appropriate to the game.

The sound generation IC 1008 is an integrated circuit for generating game sounds such as sound effects, BGM music and so on, on the base of the data stored to the data storage medium 1006 or the ROM 1002. When the sound generation IC 1008 generates the sound, the sound is outputted from the speaker 1020.

The image generation IC 1010 is an integrated circuit for generating pixel data to be outputted to the display 1018 on the basis of the image data transmitted from the RAM 1004, the ROM 1002, the data storage medium 1006, or the like.

The display 1018 means a display device such as a CRT, a LCD, a TV, a plasma display, a projector or the like.

The communication device 1024 is a device for communicating various data used by the game apparatus with an external device. If the game apparatus is connected with another game apparatus, the communication device 1024 handles communicating data with the other game apparatus. The communication device 1024 could also be used to communicate game programs and data with other devices via a communication line.

Various types of processing explained with reference to FIGS. 1 to 11 are achieved by the data storage medium 1006 which stores game programs for executing the processing as shown in flow charts of FIGS. 12 and 13, and the CPU 1000, the image generation IC 1010, and the sound generation IC 1008 which operate according to the game programs.

It should be noted that the processing accomplished by the image generation IC 1010 and so on, can be written as software applications run by the CPU 1000, a general purpose DSP, or other such device.

Figure 15:
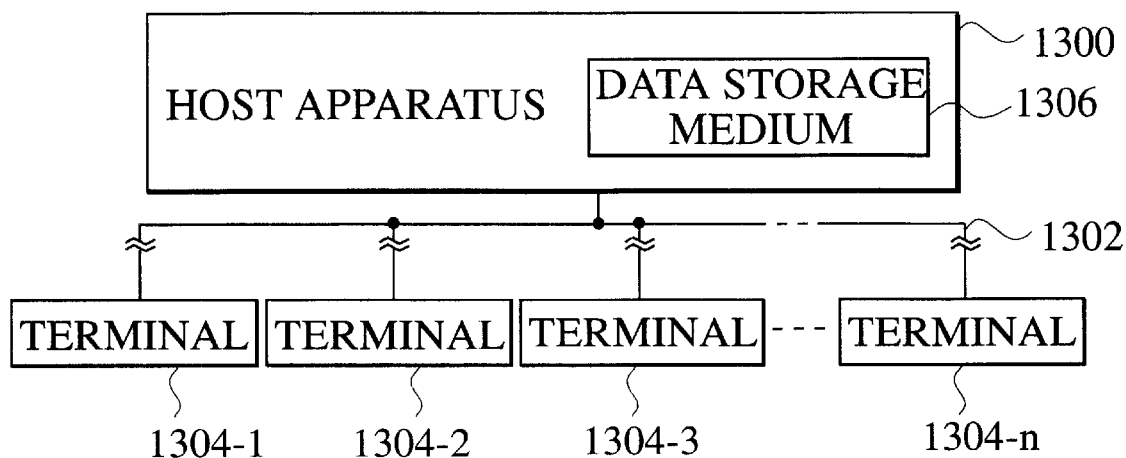
FIG. 15 is a block diagram showing an exemplary case wherein the embodiment of the present invention is applied to a host apparatus and a plurality of game terminals which are connected to each other through a communication line.

FIG. 15 shows an example of the case wherein the game apparatus of the present invention is applied to a game system comprising a host apparatus 1300 and terminals 1304-1 to 1304-n connected to the host apparatus 1300 through a communication line 1302.

In the game system, the game program 502, the attack strength data 504 and the hit effect data 510 are stored in a data storage medium 1306 under control of the host apparatus 1300, such as a magnetic disk device, a magnetic tape device, a memory or the like.

In the case wherein each of the terminals 1304-1 to 1304-n comprises a CPU, an image generation IC and a sound generation IC, to generate game images and game sounds as a stand-alone device, the host apparatus 1300 sends the game program 502, the attack strength data 504, the hit effect data 510 and so on, to each of the terminals 1304-1 to 1304-n, through the communication line 1302. On the other hand, in the case wherein each of the terminals 1304-1 to 1304-n cannot generate game images and game sounds as a stand-alone device, the host apparatus 1300 generates game images and game sounds and sends them to each of terminals 1304-1 to 1304-n. Therefore, each terminal outputs the game images and the game sounds thereon.

As described above, it is possible that the game apparatus of the present invention changes the generating direction of the hit effect according to the attack direction. Accordingly, for example, it is possible that the generating direction of the hit effect generated when the attack is hit is directed in the same direction as the attack direction. As a result, it is possible that the player directly gets the attack direction, and it is possible to provide a more impressive fighting image to the player.

Although the present invention has been explained according to the above-described embodiment, it should also be understood that the present invention is not limited to the embodiment and various changes and modifications may be made to the invention without departing from the gist thereof.

For example, although the hit decision unit 212 decides the attack strength from the attack strength data 504 on the basis of the character and the attack technique according to the above-described embodiment, the hit decision unit 212 may decide the attack strength in consideration of the hit part of the opponent character. More particularly, for example, the hit decision unit 212 may decide the attack strength so that the attack strength increases when the attack is hit on the viral part, the weak part or the like, of the opponent character.

Further, in the case wherein the opponent character defends oneself against the attack of the attack character or the opponent character also attacks the attack character, the hit decision unit 212 may decide the attack strength of the attack character and the attack strength including the defensive strength of the opponent character, from the attack strength data 504, to calculate the difference between the attack strength of the attack character and the attack strength of the opponent character. Therefore, the hit effect control unit 214 may decide the effect pattern according to the difference of the attack strengths.

Further, for example, although the hit effect control unit 214 decides the effect pattern from the effect pattern data 512 on the basis of the character and the attack strength according to the above-mentioned embodiment, the effect control unit 214 may have a predetermined attack strength to decide a different effect pattern in the only case wherein the attack character hit the attack having not less than the predetermined attack strength, on the opponent character. Furthermore, for example, the effect control unit 214 may decide the effect pattern according to the attack technique.

Further, the hit effect control unit 214 may further change the size, the disappearing speed and so on, of the effect pattern specified thereby, according to the attack strength of the opponent character, the hit part of the opponent character or the like. Furthermore, the hit effect control unit 214 may specify the effect pattern, for example, according to only the character, to change only the size and the disappearing speed of the specified effect pattern according to the attack strength. In other words, the hit effect control unit 214 may generate the hit effect having the invariable color and form and the variable size and disappearing speed, according to the attack strength, when the attack character hits the attack on the opponent character.

More particularly, for example, the transparency of each particle is fixed at "1" in all the frames after the predetermined frame, of the effect control data 514 according to the predetermined effect pattern. As a result, the hit effect disappears in all the frames after the predetermined frame. In other words, the predetermined value of the transparency of the particle is changed, and thereby the disappearing speed of particle (the disappearing speed of the hit effect) can be changed.

Further, for example, the transparency of the particle having the central position separated from the generating point by the predetermined distance or more is set at "1". As a result, it is possible to generate the hit effect having the size according to the predetermined distance. In other words, the predetermined distance from the generating point of the hit effect is chanted, and thereby it is possible to change the size of the hit effect.

Further, although the generating direction of the hit effect is equal to the attack direction according to the above-described embodiment, for example, the hit effect may be generated in a direction opposite to the attack direction.

Furthermore, for example, the hit effect may be generated for the opponent character when the attack character hits the attack on the opponent character. In this case, the hit effect may be generated in the generating direction from the hit position to the central position of gravity of the opponent character, or hit effect may be generated in the direction in which the opponent character moves according to the attack of the attack character.

Effects according to the embodiment of the present invention will be indicated, as follows.

According to the present invention, it is possible to change the generating direction of the hit effect according to the offensive direction. Consequently, because the hit effect is always generated in the same direction as the attack direction, it is possible that the player directly senses the attack direction. As a result, it is possible to provide a more impressive fighting image to the player.

Further, it is possible to generate various hit effects according to the attack condition such as the attack strength, the attack technique, the attack character and so on, and to directly provide the attack strength and the attack technique to the player. As a result, it is possible to provide a more exciting fighting image to the player.

Furthermore, because the hit effect illuminates the characters and the objects in the object space, it is possible to increase a visual effect of the hit effect.

What is claimed is:

1. A game apparatus for generating an image to be viewed from a predetermined viewpoint in an object space of a predetermined game wherein a plurality of characters fight with one another, to execute the predetermined game, the game apparatus comprising:
a memorizing section for memorizing hit effect data representative of a hit effect, therein;
a hit decision section for deciding whether one of the characters hits an attack on one another of the characters, or not; and
a hit effect generation section for changing the hit effect data memorized in the memorizing section according to the attack decided by the hit decision section, to generate the hit effect in the object space according to the hit effect data changed thereby, the hit effect data having at least one character having a plurality of techniques and a plurality of attack strengths associated with each technique.

2. A game apparatus as claimed in claim 1,
wherein the hit effect data is modeled into a particle.

3. A game apparatus as claimed in claim 1,
wherein the hit effect generation section changes the hit effect data to generate the hit effect directed in a direction according to a direction of the attack decided by the hit decision section.

4. A game apparatus as claimed in claim 1,
wherein the hit effect generation section changes the hit effect data to generate the hit effect of a type according to a strength or a technique of the attack decided by the hit decision section.

5. A game apparatus as claimed in claim 1,
wherein the hit effect generation section changes the hit effect data to generate the hit effect of a type according to a type of the character which hits the attack decided by the hit decision section.

6. A game apparatus as claimed in claim 1,
wherein the hit effect generation section changes the hit effect data to generate the hit effect having a disappearing speed according to a strength or a technique of the attack decided by the hit decision section.

7. A game apparatus as claimed in claim 1, further comprising:
a light source setting section for setting a predetermined light source in the object space on the basis of a position at which the hit effect is generated, when the hit effect generation section generates the hit effect.

8. A game apparatus as claimed in claim 7,
wherein the predetermined light source has a color fitted to a color of the hit effect generated by the hit effect generation section.

9. A game apparatus as claimed in claim 7,
wherein the light source setting section sets the predetermined light source so as to have a strength or an irradiating range according to the attack decided by the hit decision section.

10. A storage medium having a computer-executable program recorded thereon, wherein the program comprises:
a program code of generating an image to be viewed from a predetermined viewpoint in an object space of a predetermined game wherein a plurality of characters fight with one another, to execute the predetermined game;
a program code of memorizing hit effect data representative of a hit effect;
a program code of deciding whether one of the characters hits an attack on one another of the characters, or not; and
a program code of changing the hit effect data according to the attack, to generate the hit effect in the object space according to the hit effect data changed, the hit effect data having at least one character having a plurality of techniques and a plurality of attack strengths associated with each technique.

11. A storage medium having a computer-executable program recorded thereon, as claimed in claim 10, wherein the program further comprises:
a program code of modeling the hit effect data into a particle.

12. A storage medium having a computer-executable program recorded thereon, as claimed in claim 10, wherein the program further comprises:

a program code of changing the hit effect data to generate the hit effect directed in a direction according to a direction of the attack.

13. A storage medium having a computer-executable program recorded thereon, as claimed in claim 10, wherein the program further comprises:

a program code of changing the hit effect data to generate the hit effect of a type according to a strength or a technique of the attack.

14. A storage medium having a computer-executable program recorded thereon, as claimed in claim 10, wherein the program further comprises:

a program code of setting a predetermined light source in the object space on the basis of a position at which the hit effect is generated, when the hit effect is generated.

15. A computer process for performing the steps of:

generating an image to be viewed from a predetermined viewpoint in an object space of a predetermined game wherein a plurality of characters fight with one another, to execute the predetermined game;

memorizing hit effect data representative of a hit effect;

deciding whether one of the characters hits an attack on one another of the characters, or not; and changing the hit effect data according to the attack, to generate the hit effect in the object space according to the hit effect data changed, the hit effect data having at least one character having a plurality of techniques and a plurality of attack strengths associated with each technique.

16. A computer process as claimed in claim 15, for further performing the step of:

modeling the hit effect data into a particle.

17. A computer process as claimed in claim 15, for further performing the step of:

changing the hit effect data to generate the hit effect directed in a direction according to a direction of the attack.

18. A computer process as claimed in claim 15, for further performing the step of:

changing the hit effect data to generate the hit effect of a type according to a strength or a technique of the attack.

19. A computer process as claimed in claim 15, for further performing the step of:

setting a predetermined light source in the object space on the basis of a position at which the hit effect is generated, when the hit effect is generated.

20. A game apparatus comprising:

an executing section for executing a predetermined game wherein a plurality of characters fight with one another;

a memorizing section for memorizing hit effect data representative of a hit effect, therein;

a hit decision section for deciding whether one of the characters hits an attack on one another of the characters, or not; and an image generation section for generating an image including the hit effect, to be viewed from a predetermined viewpoint in an object space of the predetermined game, on the basis of the hit effect data memorized in the memorizing section according to the attack decided by the hit decision section, the hit effect data having at least one character having a plurality of techniques and a plurality of attack strengths associated with each technique.

21. A method for generating an image to be viewed from a predetermined viewpoint in an object space of a predetermined game wherein a plurality of characters fight with one another, to execute the predetermined game, the method comprising:

memorizing hit effect data representative of a hit effect;

deciding whether one of the characters hits an attack on one another of the characters, or not; and changing the hit effect data according to the attack, to generate the hit effect in the object space according to the hit effect data changed, the hit effect data having at least one character having a plurality of techniques and a plurality of attack strengths associated with each technique.

22. The method of claim 21, further comprising:

modeling the hit effect data into a particle.

23. The method of claim 21, further comprising:

changing the hit effect data to generate the hit effect directed in a direction according to a direction of the attack.

24. The method of claim 21, further comprising:

changing the hit effect data to generate the hit effect of a type according to a strength or a technique of the attack.

25. The method of claim 21, further comprising:

setting a predetermined light source in the object space on the basis of a position at which the hit effect is generated, when the hit effect is generated.

26. A computer data signal embodied in a carrier wave, comprising information used for:

generating an image to be viewed from a predetermined viewpoint in an object space of a predetermined game wherein a plurality of characters fight with one another, to execute the predetermined game;

memorizing hit effect data representative of a hit effect;

deciding whether one of the characters hits an attack on one another of the characters, or not; and changing the hit effect data according to the attack, to generate the hit effect in the object space according to the hit effect data changed, the hit effect data having at least one character having a plurality of techniques and a plurality of attack strengths associated with each technique.

27. The computer data signal of claim 26, further comprising information used for:

modeling the hit effect data into a particle.

28. The computer data signal of claim 26, further comprising information used for:

changing the hit effect data to generate the hit effect directed in a direction according to a direction of the attack.

29. The computer data signal of claim 26, further comprising information used for:

changing the hit effect data to generate the hit effect of a type according to a strength or a technique of the attack.

30. The computer data signal of claim 26, further comprising information used for:

setting a predetermined light source in the object space on the basis of a position at which the hit effect is generated, when the hit effect is generated.

* * * * *